(12) United States Patent
Chen et al.

(10) Patent No.: US 8,982,508 B1
(45) Date of Patent: Mar. 17, 2015

(54) METHOD FOR PROVIDING A SIDE SHIELD FOR A MAGNETIC RECORDING TRANSDUCER

(71) Applicant: Western Digital (Fremont), LLC, Fremont, CA (US)

(72) Inventors: Yan Chen, Fremont, CA (US); Donghong Li, Pleasanton, CA (US); Lien-Chang Wang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 18 days.

(21) Appl. No.: 13/851,348

(22) Filed: Mar. 27, 2013

Related U.S. Application Data

(63) Continuation of application No. 13/285,267, filed on Oct. 31, 2011, now Pat. No. 8,419,954.

(51) Int. Cl.
*G11B 5/127* (2006.01)

(52) U.S. Cl.
USPC ....................................... 360/125.3

(58) Field of Classification Search
USPC ....................................... 360/125.3
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |

(Continued)

OTHER PUBLICATIONS

Notice of Allowance U.S. Appl. No. 13/285,267, filed Oct. 31, 2011, 11 pages.

*Primary Examiner* — Mark Blouin (57) ABSTRACT

A magnetic transducer having an air-bearing surface is described. The magnetic transducer includes a nonmagnetic layer on an underlayer, a pole having a plurality of sidewalls, a gap layer on the sidewalls, a seed layer and at least one side shield. The nonmagnetic layer has an aperture therein. The aperture is free of magnetic inclusions at the ABS. The pole is on the underlayer and within the aperture. The seed layer is for the side shield(s) and resides on the gap layer, a portion of the underlayer and a portion of the nonmagnetic layer. The side shield(s) residing on the seed layer and in the aperture. The side shield(s) are free of undercuts at the ABS.

5 Claims, 10 Drawing Sheets

(56) References Cited

U.S. PATENT DOCUMENTS

| | | |
|---|---|---|
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |

(56) References Cited

U.S. PATENT DOCUMENTS

| | | |
|---|---|---|
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |

(56) References Cited

U.S. PATENT DOCUMENTS

| | | |
|---|---|---|
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 7,995,307 B2 * | 8/2011 | Zheng .................... 360/125.13 |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,236 B2 * | 7/2012 | Kim et al. .................. 360/125.3 |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 * | 5/2013 | Zhang et al. .................. 360/125.3 |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |

(56) References Cited

U.S. PATENT DOCUMENTS

| | | |
|---|---|---|
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,470,186 B2 * | 6/2013 | Chen et al. ............ 216/22 |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,520,338 B2 * | 8/2013 | Udo et al. ............ 360/128 |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2008/0151437 A1 | 6/2008 | Chen et al. |
| 2008/0180861 A1 | 7/2008 | Maruyama et al. |
| 2008/0278861 A1 | 11/2008 | Jiang et al. |
| 2009/0154026 A1 | 6/2009 | Jiang et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |

* cited by examiner

METHOD FOR PROVIDING A SIDE SHIELD FOR A MAGNETIC RECORDING TRANSDUCER

CROSS REFERENCE TO RELATED APPLICATIONS

This application is a continuation of U.S. patent application Ser. No. 13/285,267, filed on Oct. 31, 2011, which is hereby incorporated by reference in its entirety.

BACKGROUND

Figure 1:
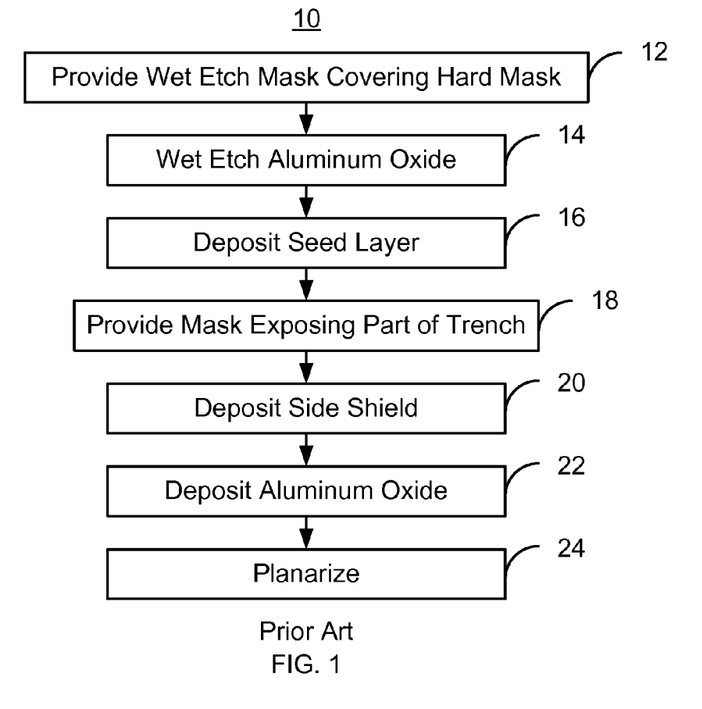
FIG. 1 is a flow chart depicting a conventional method for fabricating a side shield.

FIG. 1 is a flow chart depicting a conventional method 10 for fabricating side shields for a conventional magnetic recording transducer. For simplicity, some steps are omitted. The conventional method 10 typically starts after a pole, such as a perpendicular magnetic recording (PMR) pole has been provided in a nonmagnetic layer, such as aluminum oxide. For example, a damascene process that forms a trench in the aluminum oxide layer, deposits nonmagnetic side gap/seed layers, and deposits magnetic pole layers may be used. In addition, the portion of the magnetic material external to the trench may be removed, for example using a chemical mechanical planarization (CMP) process. A wet etch mask is provided, via step 12. The wet etch mask exposes part of the nonmagnetic layer around the pole near the location at which the air-bearing surface (ABS location) is to be formed. The portion of the nonmagnetic layer exposed by the wet etch mask is also exposed by any other masks remaining from the pole formation process.

The exposed aluminum oxide is wet etched, via step 14. Thus, a trench is formed around a portion of the pole near the ABS location. Note that side gap layers may remain after the aluminum oxide etch in step 14. In some cases, a side gap layer (or an additional side gap layer) may be deposited after step 14. The seed layer for the side shield is deposited, via step 16. A mask for the side shield is deposited, via step 18 and the side shield deposited, via step 20. The mask used for depositing the side shield may also be removed in step 20. Further, the exposed portion of the side shield seed may also be removed. Aluminum oxide is deposited, via step 22. Thus, the trench formed by the wet etch is refilled. The transducer may then be planarized, via step 24. Formation of the transducer may then be completed.

Figure 2:
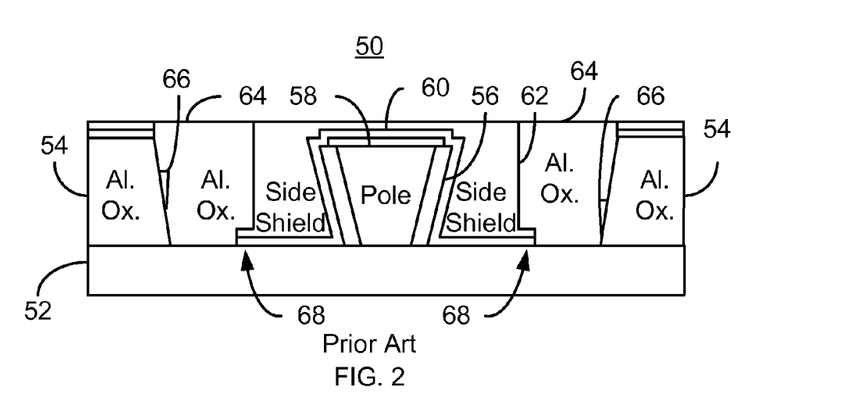
FIG. 2 is a diagram depicting an ABS view of a conventional magnetic transducer.

FIG. 2 depicts plan and air-bearing surface (ABS) views of a portion of a conventional PMR transducer 50 formed using the conventional method 10. The conventional transducer 50 includes an underlayer 52, aluminum oxide layer 54 in which the pole is formed, Ru side gap layer 56 which is deposited in the trench (not shown) is also shown. The pole 58, seed layer 60, side shield 62, and aluminum oxide layer 64 are also shown. Thus, using the conventional method 10, the side shield 62 may be formed.

Although the conventional method 10 may provide the conventional transducer 50, there may be drawbacks. The performance of the conventional transducer 50 may be compromised. In particular, fabrication using the method 10 may result in magnetic material at unexpected and/or uncontrolled locations. For example, the magnetic transducer 50 may include magnetic inclusions 66. The inclusions may be present due to the removal of excess side shield material after step 20. In addition, undercuts 68 are shown. These undercuts may be formed due to the mask provided in step 18. The mask may have a BARC or other mask underlayer that is formed for mask formation. The mask underlayer that tends to be undercut. Thus, when the side shield materials are deposited, the undercut may be filled, forming inclusions 68. Thus, magnetic material may reside at locations 66 and 68, which are inadvertent and uncontrolled. In addition, parts (not shown) of the seed layer 60 that are far from the pole 58 may be difficult to remove. There may be some portion of the magnetic side shield material residing on these remaining parts of the transducer 10. Thus, additional unwanted magnetic material may remain at the ABS of the conventional magnetic transducer 50. Like the inclusions 66 and 68, this additional magnetic material is undesirable.

Accordingly, what is needed is an improved method for fabricating a transducer.

SUMMARY

A method for fabricating a side shield for a magnetic transducer is described. The magnetic transducer has a nonmagnetic layer, a pole, a gap layer, and a hard mask having a hard mask aperture therein. The pole has sidewalls and an air-bearing surface (ABS) location corresponding to an ABS. The gap layer is between the sidewalls of the pole and a portion of the nonmagnetic layer. A first portion of the hard mask resides on the pole. A second portion of the hard mask resides on a portion of nonmagnetic layer. The hard mask aperture resides between the first portion and the second portion of the hard mask. The method includes providing a removal mask having a removal aperture therein. The removal aperture exposes a portion of the pole proximate to the ABS location and a first portion of the aperture. The removal mask covers a second portion of the aperture in a track width direction from the ABS location of the pole and covers the second portion of the hard mask. A first portion of the nonmagnetic layer exposed by the removal aperture is removed, forming a side shield trench in the nonmagnetic layer. A seed layer for the side shield is deposited. A side shield deposition mask having a deposition aperture therein is provided. The deposition aperture exposes a first portion of the side shield trench and a portion of the nonmagnetic layer in the track width direction from the ABS location of the pole. The side shield deposition mask covers a second portion of the side shield trench. At least one side shield material is deposited. A portion of the side shield material resides in the deposition aperture. The transducer is planarized to remove a portion of the side shield material external to the side shield trench. A remaining portion of the side shield material forms the side shield.

DETAILED DESCRIPTION OF THE PREFERRED EMBODIMENTS

Figure 3:
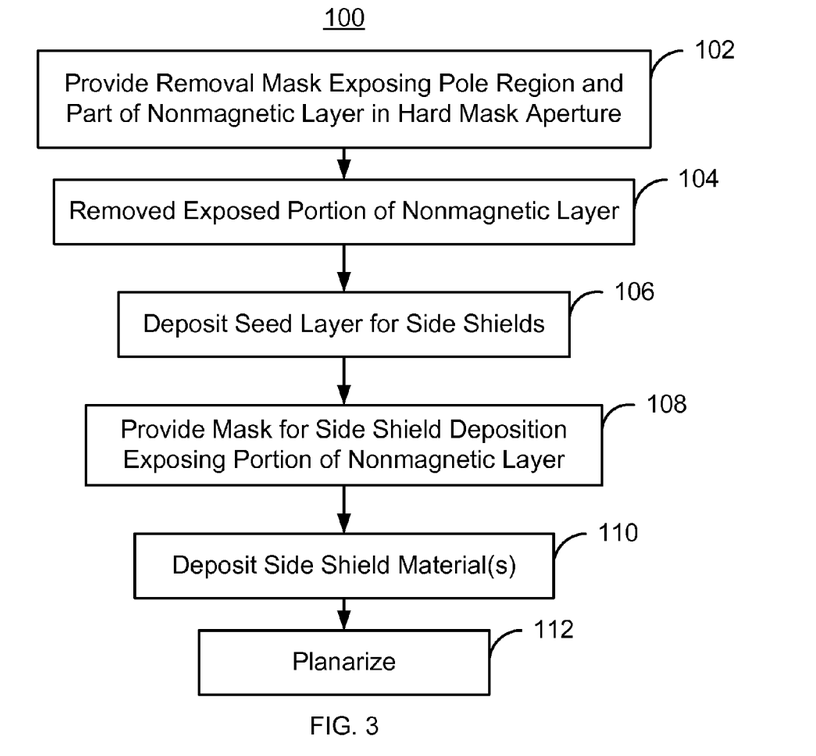
FIG. 3 is a flow chart depicting an exemplary embodiment of a method for fabricating side shield(s).

FIG. 3 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the PMR transducer. The method 100 is also described in the context of providing a single set of side shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the pole in a nonmagnetic intermediate layer. In some embodiments, the intermediate layer is an aluminum oxide layer. The nonmagnetic underlayer as well as the pole may reside on an underlayer. Further, in some embodiments, a leading edge shield is desired. In such embodiments, the leading edge shield may be provided under the underlayer. The leading edge shield is generally ferromagnetic, magnetically soft, and may include materials such as NiFe. In addition to the pole, a nonmagnetic gap layer may reside between the sidewalls of the pole and the nonmagnetic layer. In some embodiments, part of the nonmagnetic gap layer may also be under the pole. In some embodiments, a seed layer is also provided. The seed layer for the pole may be magnetic or nonmagnetic. Further, an air-bearing surface location (ABS location) marks the surface at which the air-bearing surface (ABS) will reside. As the pole has just been formed, a hard mask may still remain on the transducer. A portion of the hard mask covers the pole, while another portion of the hard mask covers part of the nonmagnetic layer. Aperture(s) in the hard mask (hard mask aperture(s)) are between these portions of the hard mask.

A removal mask having a removal aperture is provided, via step 102. In some embodiments, step 102 includes depositing a bottom antireflective coating (BARC) layer, providing a photoresist layer on the BARC layer, and patterning the photoresist to form the removal mask. In some embodiments, patterning the photoresist in step 102 results in an undercut in the BARC layer adjoining the removal aperture. In other embodiments, a BARC layer need not be used.

The removal aperture exposes a portion of the pole proximate to the ABS location. In some embodiments, this means that the removal aperture exposes the hard mask above the pole in the region of the ABS location. The removal aperture also exposes part of the hard mask aperture(s), but covers another portion of the hard mask aperture(s) in the track width direction. The covered portion of the hard mask aperture(s) is in a track width direction from the ABS location of the pole. The portion of the hard mask aperture(s) that is exposed by the removal aperture may adjoin the pole or gap layer. Thus, at the ABS, the removal aperture does not extend as far from the pole in the track width direction as do the hard mask aperture(s). The removal mask also covers at least part of the hard mask distal from the pole. A portion of the nonmagnetic layer is exposed by both the hard mask aperture and the removal aperture. Although there is overlap between the removal aperture of the removal mask and the hard mask aperture of the hard mask, the shape and location of the removal aperture differs from that of the hard mask aperture.

In addition to configuring the amount of the nonmagnetic layer exposed along in the track width direction of the pole at the ABS location, other aspects of the shape of the removal aperture may be tailored. For example, the removal aperture may have a back edge and a front edge. At least a portion of the back edge extends a depth from the ABS location in the stripe height direction. Part of the front edge of the removal aperture may be in a direction opposite to the stripe height direction from the ABS location. Part of the front edge may be on the same side of the ABS location as the back edge. Further, the removal aperture may have a canted region forming an angle with the ABS location. In some embodiments, this region is canted at an angle of at least fifteen and not more than twenty-five degrees. In some embodiments, this angle is twenty degrees.

A portion of the nonmagnetic layer exposed by the removal aperture is removed, via step 104. As discussed above, this is the portion of the nonmagnetic layer that is exposed by both the hard mask aperture and the removal aperture. In some embodiments, step 104 includes performing a wet etch appropriate to the nonmagnetic layer used. For example, an aluminum oxide wet etch may be used for an aluminum oxide nonmagnetic layer. One or more side shield trenches are formed in the nonmagnetic layer. Thus, at least part of the gap layer adjoining the sidewalls of the pole may remain after step 104 is completed. The side shield trenches extend from the gap layer in a track width direction along the ABS location. In some embodiments, the removal mask is removed after step 104 is completed.

A seed layer is deposited for the side shields, via step 106. In some embodiments, the seed layer is magnetic. In other embodiments, the seed layer is nonmagnetic.

A side shield deposition mask having a deposition aperture is provided, via step 108. In some embodiments, step 108 includes depositing a bottom antireflective coating (BARC) layer, providing a photoresist layer on the BARC layer, and patterning the photoresist to form the deposition mask. In some embodiments, patterning the photoresist in step 108 results in an undercut in the BARC layer adjoining the deposition aperture.

In some embodiments, the deposition aperture exposes part of the side shield trench. The side shield deposition mask covers another portion of the side shield trench. The deposition aperture may also expose part of the nonmagnetic layer in the track width direction from the ABS location of the pole. Stated differently, although there is overlap between the deposition aperture of the deposition mask and the removal aperture of the removal mask, the shape and location of the deposition aperture differs from that of the removal aperture. Similarly, although there is overlap between the deposition aperture of the deposition mask and the hard mask aperture of the hard mask, the shape and location of the deposition aperture differs from that of the hard mask aperture. In addition, other aspects of the deposition aperture may be configured. The deposition aperture may have a back edge extending from the ABS location in the stripe height direction to at least one throat height. The throat height(s) are less than the depth of the back edge of the removal aperture in the removal mask. Further, the front edge of the deposition mask may extend further from the ABS location in a direction opposite to the stripe height direction than the front edge of the removal aperture. Thus, the back edge of the side shields may be defined by the deposition mask, while the front edge of the side shields may be defined by the wet etch and removal mask. In other embodiments, the front edge of the deposition aperture may extend further from the ABS location in a direction opposite to the stripe height direction than the front edge of the removal mask aperture. Stated differently, the deposition aperture in the side shield deposition mask defines a throat height of the side shield in a stripe height direction perpendicular to the ABS, while the removal mask defines a canted angle of the side shield from the ABS.

At least one side shield material is deposited, via step 110. In some embodiments, step 110 includes plating the side shield material(s). Thus, a portion of the side shield material is in the deposition aperture. Part of the side shield material is also in part of the shield trench. In some embodiments, the deposition mask is removed after step 110 is completed. In addition, any extraneous side shield seed layer may be removed. An additional nonmagnetic layer may be deposited after the side shield material(s) and before step 112, described below.

A planarization step is performed to remove a portion of the side shield material external to the side shield trench, via step 112. A remaining portion of the side shield material(s) form the side shield. The side shield(s) may have a canted region at an angle from the ABS location due to the canted region of the removal mask. A portion of the front edge of the side shield(s) may correspond to the front edge of the removal aperture and, therefore, a wet etch performed in step 104. The back edge of the side shield(s) may correspond to the back edge of the deposition aperture of the deposition mask. Formation of the magnetic transducer may then be completed.

Figure 4:
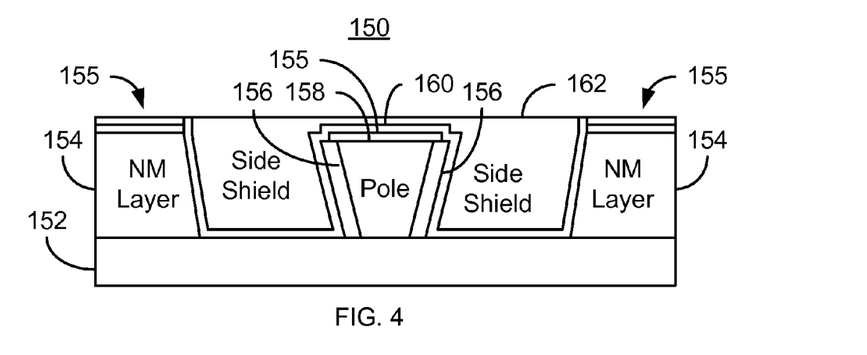
FIG. 4 is a diagram depicting an exemplary embodiment of a magnetic transducer having side shields.

FIG. 4 is a diagram depicting an exemplary embodiment of a portion of a magnetic transducer 150 having side shields that may be formed using the method 100. In particular, an ABS view is shown. For clarity, FIG. 4 is not to scale. The magnetic transducer 150 may be part of a merged heat that includes at least one read transducer (not shown) in addition to at least one magnetic transducer 150. The magnetic transducer 150 includes an underlayer 152, which may reside on a bottom shield (not shown). Also included are a nonmagnetic layer 154, hard mask 155, a gap layer 156, pole 158, seed layer 160, and side shield 162. The hard mask 155 may be used in formation of the pole 158. The pole 158 may be formed in the nonmagnetic layer 154. Portions of the nonmagnetic layer 154 adjoining the gap layer 156 may be removed in step 104, forming a trench in a portion of which the side shield 162 is formed. In the embodiment shown, the seed layer 160 is deposited in step 106, before a side shield deposition mask (not shown) is formed. However, in other embodiments, the side shield deposition mask may be formed in step 108 before the seed layer 160 is deposited in step 106. After fabrication of the side shield 162 is completed, other components including but not limited to coil(s), a write gap, and a top shield may be formed.

Using the method 100, side shield 162 having the desired geometry may be fabricated. The combination of the shape and location of the removal aperture and the shape and location of the deposition aperture allow for a reduction or elimination of extraneous magnetic material at the ABS. More specifically, the removal aperture, and thus the trench for the side shield formed in the nonmagnetic layer is smaller. Thus, there may be less seed layer remaining on portions of the transducer 150 from which it is desired to be removed. As a result, removal of unwanted portions of the seed layer 160 may be better accomplished. If desired, a canted region of the side shield 162 (not explicitly shown in FIG. 4) may be defined by the front edge of the removal aperture. The deposition aperture may reside on the hard mask 155 at the ABS location. Thus, any undercuts formed in the deposition mask also reside on the hard mask 155. As these undercuts are external to the trench formed for the side shields 162, any side shield material grown in the undercuts may be removed in the planarization step 112. Magnetic inclusions due to the undercut may thus be reduced or eliminated. Further, the back edge of the deposition aperture, and thus the back edge (not shown in FIG. 4) of the side shields 162 may be photolithographically defined. More specifically, the throat height of the side shields 162 may be better controlled. Thus, the fabrication of the side shield 162 may be enhanced and performance of the magnetic transducer 150 improved.

Figure 5:
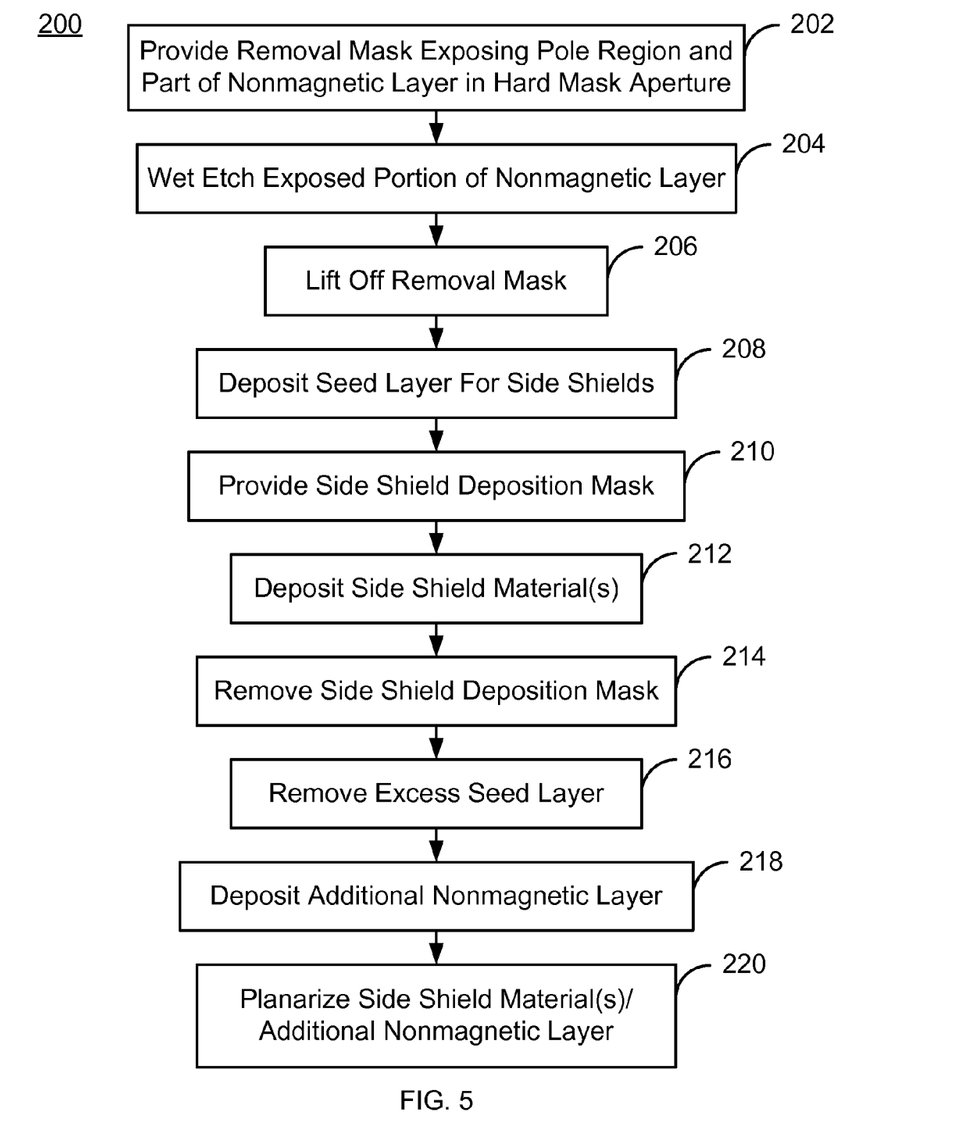
FIG. 5 is a flow chart depicting another exemplary embodiment of a method for fabricating side shields for a magnetic recording transducer.

FIG. 5 is a flow chart depicting another exemplary embodiment of a method 200 for fabricating a PMR transducer. For simplicity, some steps may be omitted. FIGS. 6-21 are diagrams depicting ABS location and plan views of an exemplary embodiment of a portion of a transducer during 250 fabrication. For clarity, FIGS. 6-21 are not to scale. Although FIGS. 6-21 depict the ABS location (location at which the ABS is to be formed) and ABS at a particular point in the pole, other embodiments may have other locations for the ABS. Referring to FIGS. 5-21, the method 200 is described in the context of the transducer 250. However, the method 200 may be used to form another device (not shown). The transducer 250 being fabricated may be part of a merged head that also includes a read head (not shown in FIGS. 6-21) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

Figure 6:
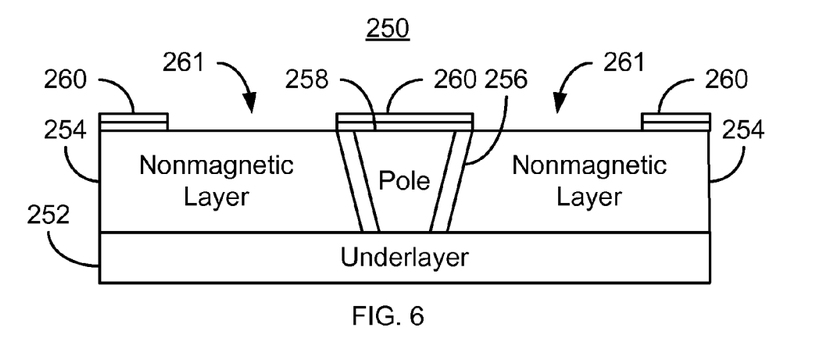
FIGS. 6-21 are diagrams depicting an exemplary embodiment of a magnetic recording transducer during fabrication.
Figure 7:
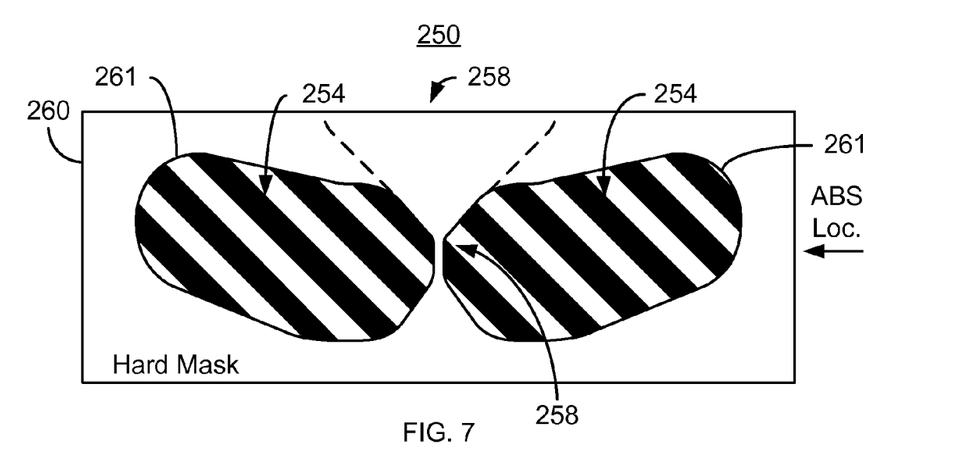

FIGS. 6-7 depict ABS location and plan views, respectively, of the transducer 250 before the step 202 of the method 200 is performed. The ABS location is also indicated in the plan view shown in FIG. 7. Thus, the transducer 250 includes an underlayer 252, which may be nonmagnetic and may reside on a leading edge shield. Also shown is a nonmagnetic layer 254 that may be aluminum oxide. The pole 258 has been formed in the nonmagnetic layer 254. In the embodiment shown, nonmagnetic gap layer 256 separates the pole 258 from the nonmagnetic layer 254. In some embodiments, the gap layer 256 includes Ru. In some embodiments, the gap layer 256 may also reside under the pole 258. In the plan view of FIG. 7, the yoke portion of the pole 258 is indicated by a dashed line, while the pole tip is located near the ABS location. A hard mask 260 having hard mask apertures 261 is also shown. The hard mask 260 is used in fabricating the pole 258. As can be seen in FIG. 7, the hard mask apertures 261 expose a portion of the nonmagnetic layer 254. This portion is cross-hatched in FIG. 7.

Figure 8:
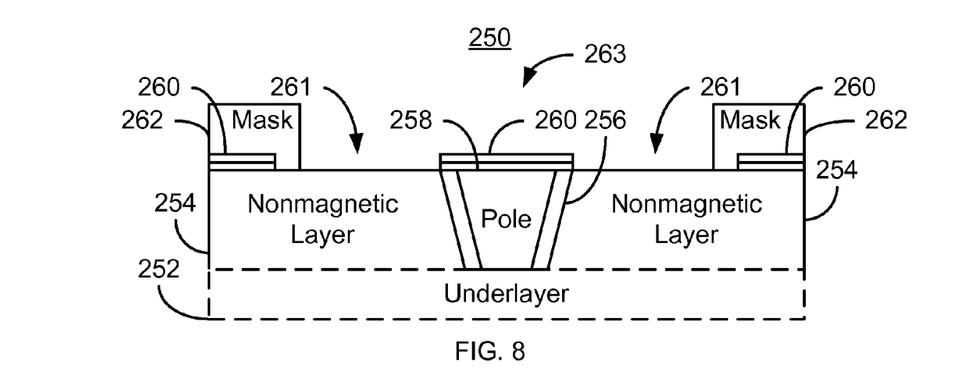
Figure 9:
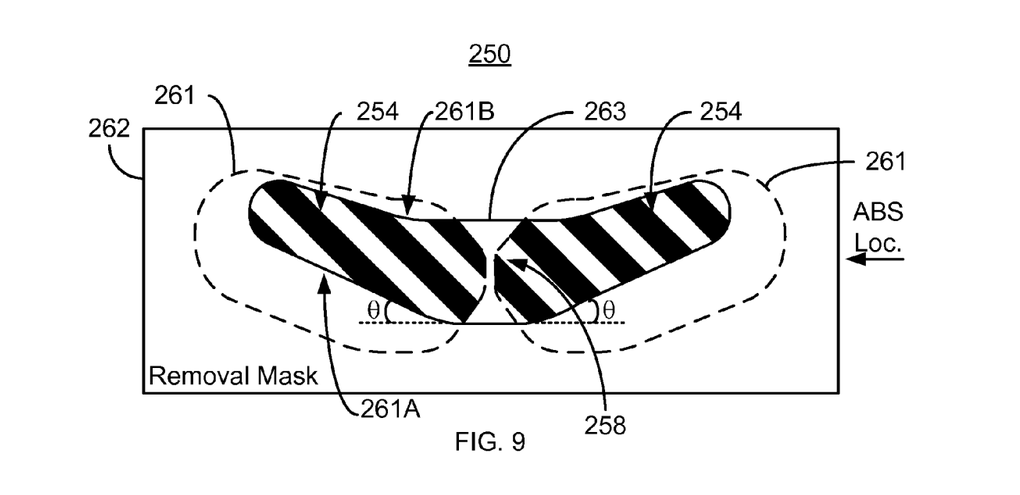

A removal mask having a removal aperture is provided, via step 202. Step 202 corresponds to step 102 in the method 100. In some embodiments, a photoresist layer may be deposited and patterned in step 202. In some such embodiments, an adhesion layer may also be used under the photoresist as part of the mask. Currently, such embodiments are preferred. In alternate embodiments, a BARC layer might also be used. FIGS. 8-9 depict the ABS location and plan views, respectively, of the transducer 250 after step 202 is performed. For clarity, the portions of the pole 258 under the hard mask 250 are no longer indicated in the plan view of FIG. 9. Instead, the hard mask aperture 261 under the removal mask 262 is shown by a dashed line.

A removal mask 262 having removal aperture 263 provided in step 202 is also shown. In the embodiment shown, a BARC layer is not used. As can be seen in FIGS. 8 and 9, the removal aperture 263 exposes a portion of the pole 258 around the ABS location. In the embodiment shown, the removal aperture exposes the portion of the hard mask 260 above the pole 258. The removal aperture also exposes part of the hard mask apertures 261, but covers another portion of the hard mask apertures in the track width direction (left to right in FIGS. 8-9). Thus, at the ABS, the removal aperture 263 does not extend as far from the pole 258 in the track width direction as do the hard mask apertures 261. In the region in which the removal aperture 263 and the hard mask aperture 261 overlap, the nonmagnetic layer 254 is exposed. This portion of the nonmagnetic layer 254 is cross-hatched in FIG. 9. As can also be seen in FIG. 9, the removal aperture 261 has a front edge 261A and a back edge 261B. The back edge 261B is in the stripe height direction from the ABS location (toward the top of FIG. 9). A portion of the front edge 261A extends in the opposite direction (down in FIG. 9) from the ABS location. Further, the removal aperture 261 has canted regions forming an angle, θ, with the ABS location (e.g. with a surface parallel to the ABS location. In some embodiments, the angle, θ, of at least fifteen and not more than twenty-five degrees. In some embodiments, θ is twenty degrees. For clarity, the angle θ is only indicated in FIG. 9.

Figure 10:
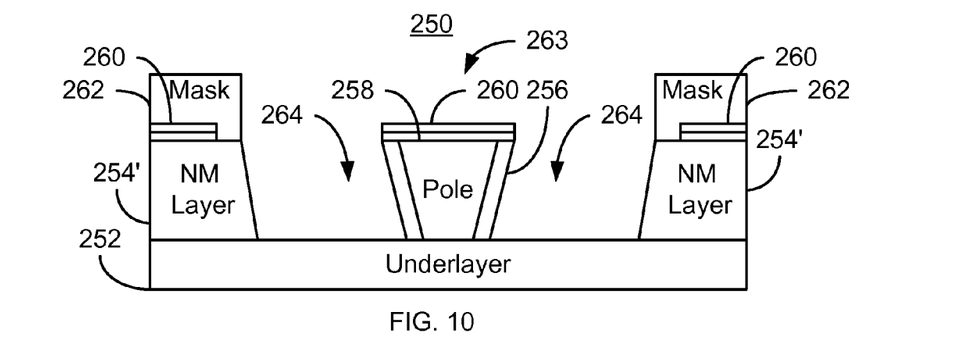
Figure 11:
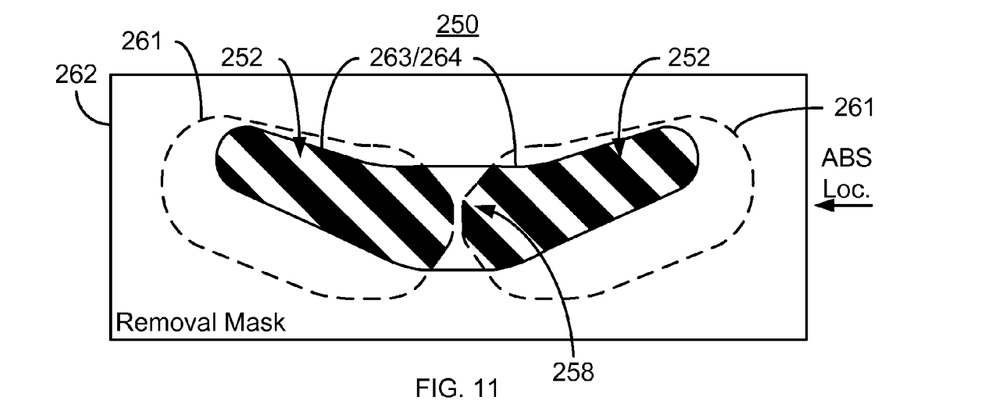

The exposed portion of the nonmagnetic layer 254 is wet etched, via step 204. Step 204 may include performing an alumina wet etch. FIGS. 10-11 depict ABS location and plan views, respectively, of the transducer 250 after step 204 is performed. At least part of the gap layer 256 remains after step 204 is completed. However, side shield trenches 264 have been formed in the nonmagnetic layer 254'. The side shield trenches 264 exposed the underlying layer 252. Thus, the cross-hatched region in FIG. 11 now corresponds to the underlayer 252. The removal mask is lifted off after step 204 is completed, via step 206.

Figure 12:
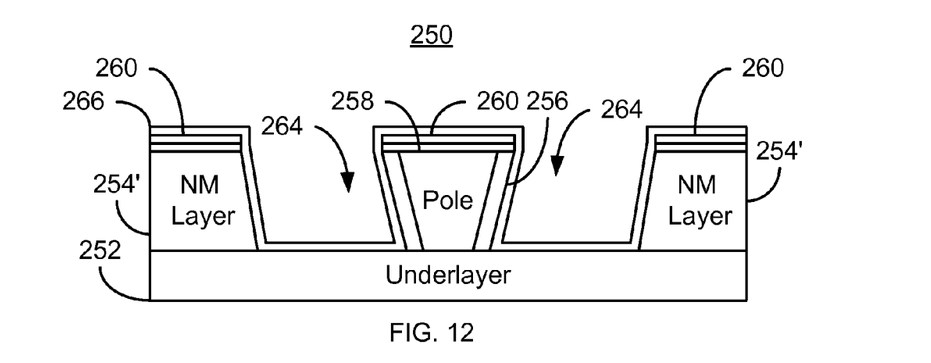

A seed layer is deposited for the side shields, via step 208. In some embodiments, the seed layer is magnetic. In other embodiments, the seed layer is nonmagnetic. Also, in the embodiment shown, the seed layer is deposited before the side shield deposition mask, discussed below, is formed. However, in other embodiments, the side shield deposition mask may be provided first. FIG. 12 depicts and ABS location view of the transducer 250 after step 208 is performed. Thus, the seed layer 266 is shown.

Figure 13:
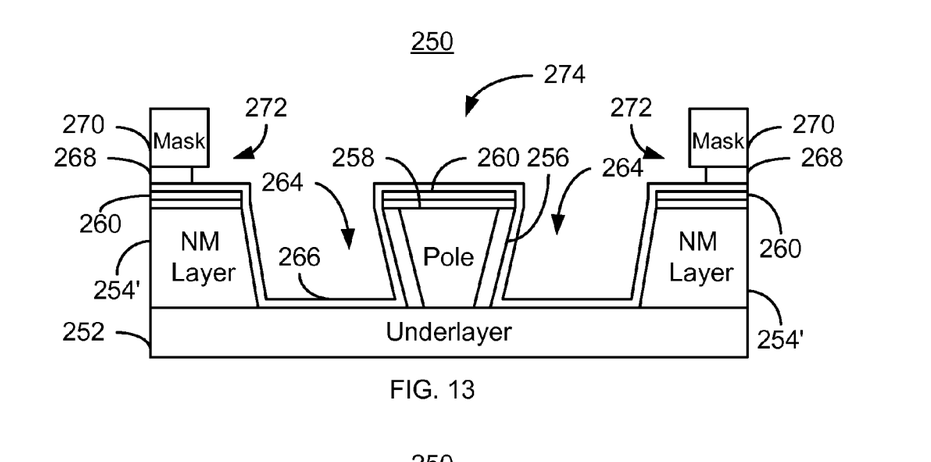
Figure 14:
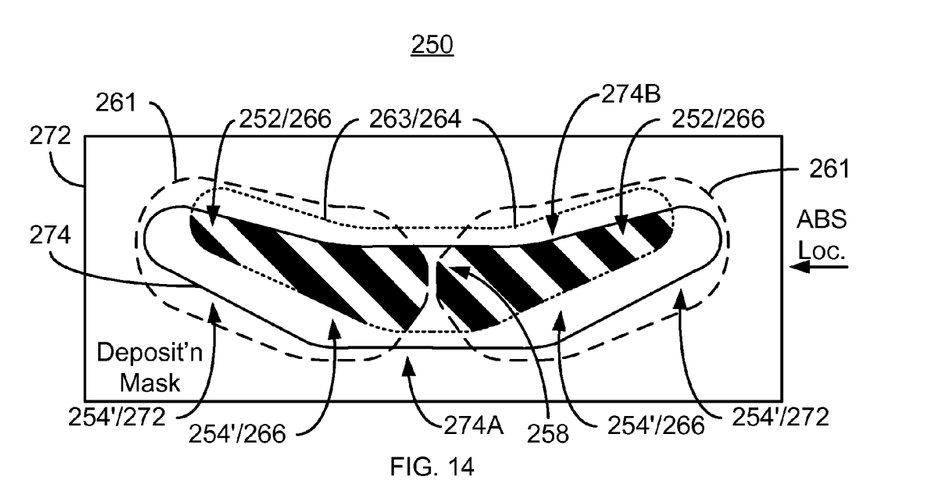

A side shield deposition mask is provided, via step 210. In some embodiments, step 210 includes depositing a BARC layer, providing a photoresist layer on the BARC layer, and patterning the photoresist to form the deposition mask. The side shield deposition mask includes a deposition aperture corresponding to the desired location of the side shields. FIGS. 13-14 depict ABS and plan views of the transducer 250 after step 210 is performed. Thus, a side shield deposition mask 272 is provided. In the embodiment shown, the deposition mask 272 includes a BARC layer 268 and a photoresist layer 270. A deposition aperture 274 for the side shields has been formed in the side shield deposition mask. Thus, as can be seen in FIG. 13, the mask 272 has an undercut at the edges of the aperture 274.

In the plan view of FIG. 14, the location of the removal aperture 263 and side shield trenches 264 of the removal mask (which has been removed) is indicated by a dotted line. The location of the hard mask aperture 261 is indicated by the dashed line in FIG. 14. The aperture 274 in the deposition mask 272 is indicated by a solid line. As can be seen in the plan view of FIG. 14, there is some overlap between the removal aperture 263/side shield trenches 264 and the deposition aperture 274. This overlap is the region in side shields will reside and is cross-hatched. The side shield deposition mask 272 covers another portion of the removal aperture 263/side shield trenches 264. In the regions where the deposition aperture 274 and the removal aperture 263/side shield trenches 264 do not overlap, the deposition aperture 274 exposes part of the nonmagnetic layer 254'. Also exposed is the seed layer 266 on the nonmagnetic layer 254'. Thus, these regions are indicated by arrows 254'/266. Further, the deposition aperture 274 may cover portions of the nonmagnetic layer 254' exposed by the hard mask aperture 261 but which were covered by the removal mask (not shown in FIG. 14. Such regions are indicated by arrows 254'/272. Further, in the embodiment shown, the deposition aperture 274 includes front edge 274A and back edge 274B. As can be seen in FIG. 14, the back edge 274B is closer to the ABS than the back edge of the removal aperture 263. Thus, the back edge of the side shields, otherwise known as the throat height of the side shields, will be defined by the back edge 274B of the deposition aperture. In contrast, the front edge 274A of the deposition aperture 274 is further from the ABS location than the front edge of the removal aperture 263 and, therefore, the front edge of the side shield trenches 264. Thus, the front edge of the side shields, including the canted region, will be defined by the removal aperture 263/side shield trenches 264. Thus, as can be seen in FIG. 14, there is some overlap between the apertures 261, 263, and 274. However, the shapes and locations of the apertures 261, 263, and 264 differ.

Figure 15:
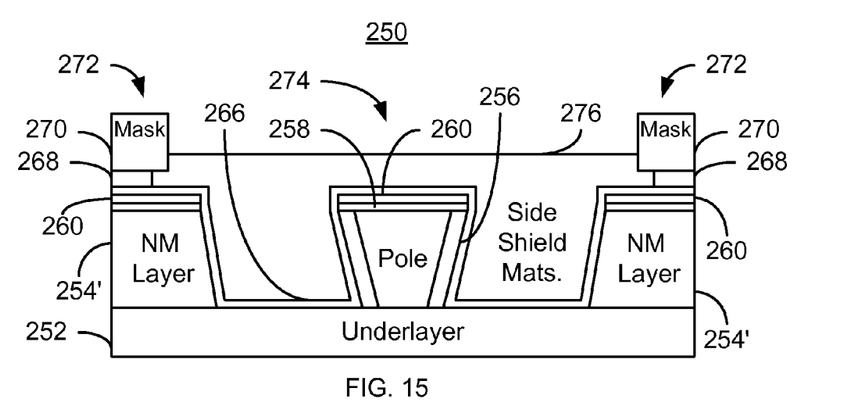
Figure 16:
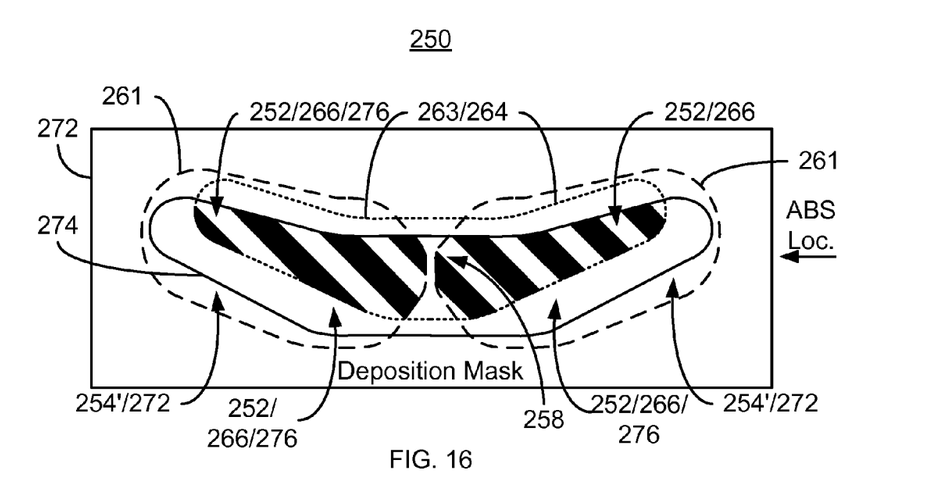

The material(s) for the side shield are deposited, via step 212. In some embodiments, step 212 includes plating the side shield material(s), such as NiFe. FIGS. 15-16 depict the transducer 250 after step 212 is performed. Thus, the side shield material 276 is shown. For clarity, the side shield material 276 is shown only in the deposition aperture 274 of the deposition mask 272. No side shield material is shown on top of the deposition mask 272. Note that part of the side shield materials fill the undercut in the mask 272. Part of the side shield material 276 is also in part of the shield trenches 264. More specifically, the side shield material 276 is shown as crosshatched in the regions that the deposition aperture 274 overlaps with the side shield trenches 264. The side shields are formed from the side shield materials in this region.

Figure 17:
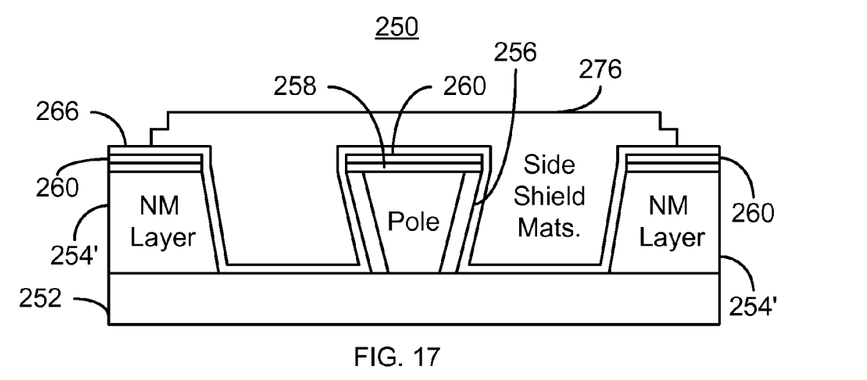

The side shield deposition mask is removed after deposition of the side shield materials 276, via step 214. In some embodiments, this is performed via a lift-off process. FIG. 17 depicts an ABS location view of the transducer 250 after step 214 is performed. Thus, the mask 272 has been removed. Note that the side shield material 276 is notched at its edges, in locations corresponding to the undercut in the deposition mask.

Figure 18:
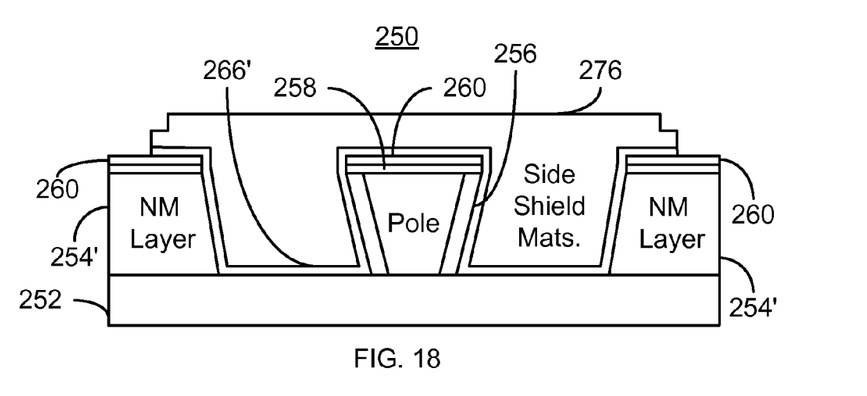
Figure 19:
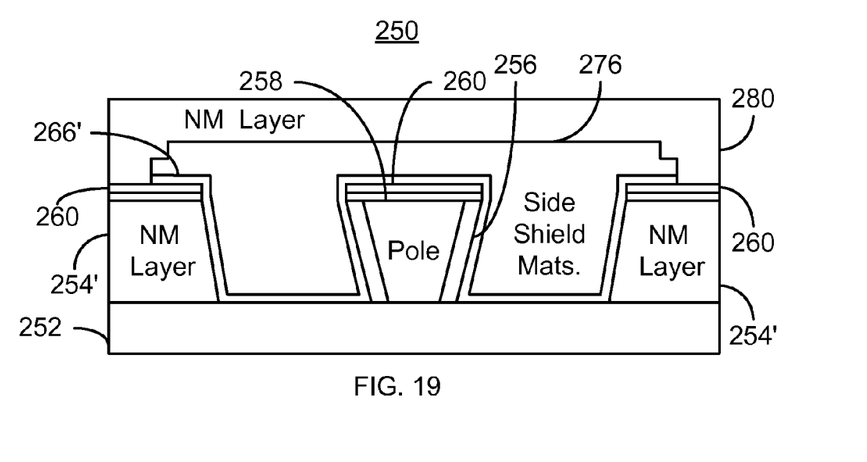

Any excess seed layer 266 is removed, via step 216. This may be performed by an ion milling step. FIG. 18 depicts the transducer 250 after step 216 is performed. Thus, a portion of the seed layer 266' remaining is shown. The seed layer 266' that was exposed by the side shield materials 276 has been removed. An additional nonmagnetic layer is deposited, via step 218. The additional nonmagnetic layer may be aluminum oxide. However in other embodiments, other and/or additional materials may be used. FIG. 19 depicts an ABS location view of the transducer 250 after step 218 has been performed. Thus, the additional nonmagnetic layer 280 is shown.

Figure 20:
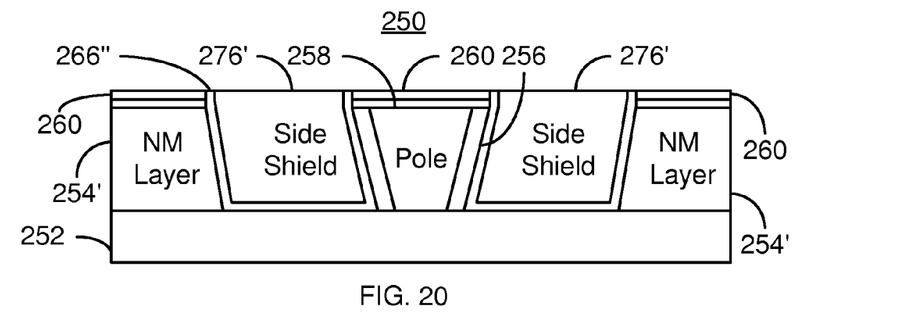
Figure 21:
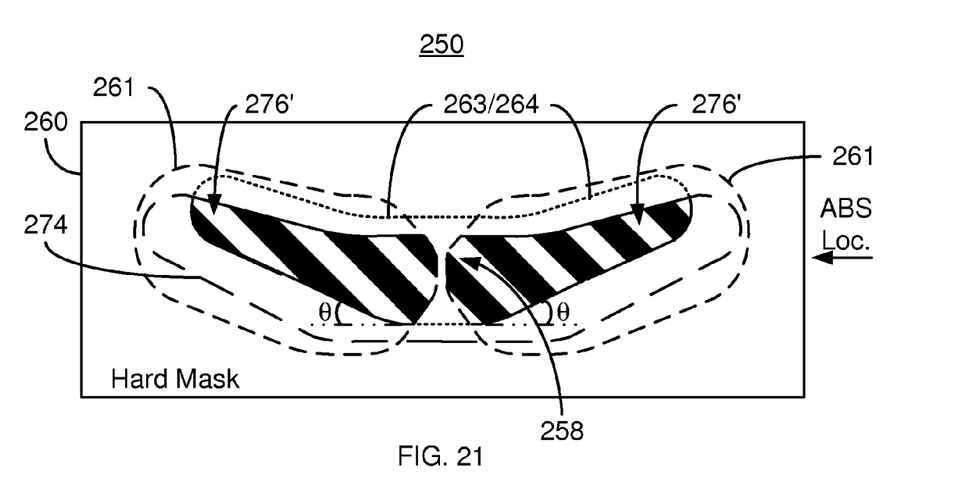

A planarization step is performed to remove a portion of the side shield material external to the side shield trench, via step 220. For example, a CMP may be used. FIGS. 20-21 depict ABS location and plan views, respectively. Portions of the side shield materials 276 and seed layer external to the side shield trenches 264 have been removed. Thus, side shields 276' and seed layer 266'' remain. The removal aperture 263 and side shield trenches 264 are shown by a dotted line. The hard mask aperture 261 and deposition aperture are shown by dashed lines of different length. As can be seen in the plan view, the side shields 276' correspond to the overlap between the hard mask aperture 261, the removal aperture 263/side shield trenches 264, and the deposition aperture 276. The side shields 276' are shown as cross hatched in FIG. 21. The side shields 276 have a canted region at an angle, θ, from the ABS location due to the canted region of the removal mask. A portion of the front edge of the side shields 276 corresponds to the front edge of the removal aperture 263 and, therefore, the wet etch performed in step 204. The back edge of the side shields 276 corresponds to the back edge of the deposition aperture 276 of the deposition mask 272. Formation of the magnetic transducer 250 may then be completed. Thus, using the method 200, the transducer 250 may be fabricated. The transducer 250 may share the benefits of the transducer 150. The side shields 276' have a back edge defined by the deposition mask 272 and a front edge defined by the removal mask. The throat height of the side shields 276' may be better controlled. The side shields 276' also have canted regions at an angle θ from the ABS location. The combination of the shape and location of the removal aperture 263 and the shape and location of the deposition aperture 274 allow for a reduction or elimination of extraneous magnetic material at the ABS. For example, any magnetic material corresponding to undercuts in the deposition mask 272 are removed by the planarization of step 220. Magnetic inclusions due to the undercut may thus be reduced or eliminated. Thus, the fabrication of the side shield 276' may be enhanced and performance of the magnetic transducer 250 improved.

We claim:

1. A magnetic transducer having an air-bearing surface (ABS) and an underlayer, the magnetic transducer comprising:
   a nonmagnetic layer on the underlayer and having an aperture therein, the aperture being free of magnetic inclusions at the ABS;
   a pole having a plurality of sidewalls, the pole residing on the underlayer and within the aperture;
   a gap layer residing on the sidewalls
   a seed layer for a side shield, the seed layer residing on the gap layer, a portion of the underlayer and a portion of the nonmagnetic layer;
   at least one side shield residing on the seed layer and in the aperture, the at least one side shield being free of undercuts at the ABS.

2. The magnetic transducer of claim 1 wherein the seed layer is a nonmagnetic seed layer.

3. The magnetic transducer of claim 1 wherein the seed layer is a magnetic seed layer.

4. The magnetic transducer of claim 1 wherein the at least one side shield includes a canted region, the canted region being canted at an angle from the ABS, the angle being at least fifteen degrees and not more than twenty-five degrees.

5. A magnetic recording disk drive comprising:
   a slider; and
   a magnetic transducer having an air-bearing surface (ABS), the magnetic transducer including an underlayer, a nonmagnetic layer, a pole, a gap, at least one shield, a gap, a seed layer, the nonmagnetic layer being on the underlayer and having an aperture therein, the aperture being free of magnetic inclusions at the ABS, the pole having a plurality of sidewalls, the pole residing on the underlayer and within the aperture, the gap layer residing on the sidewalls, the seed layer being for the at least one side shield, the seed layer residing on the gap layer, a portion of the underlayer and a portion of the nonmagnetic layer, the at least one side shield residing on the seed layer and in the aperture, the at least one side shield being free of undercuts at the ABS.

* * * * *